UNITED STATES PATENT OFFICE.

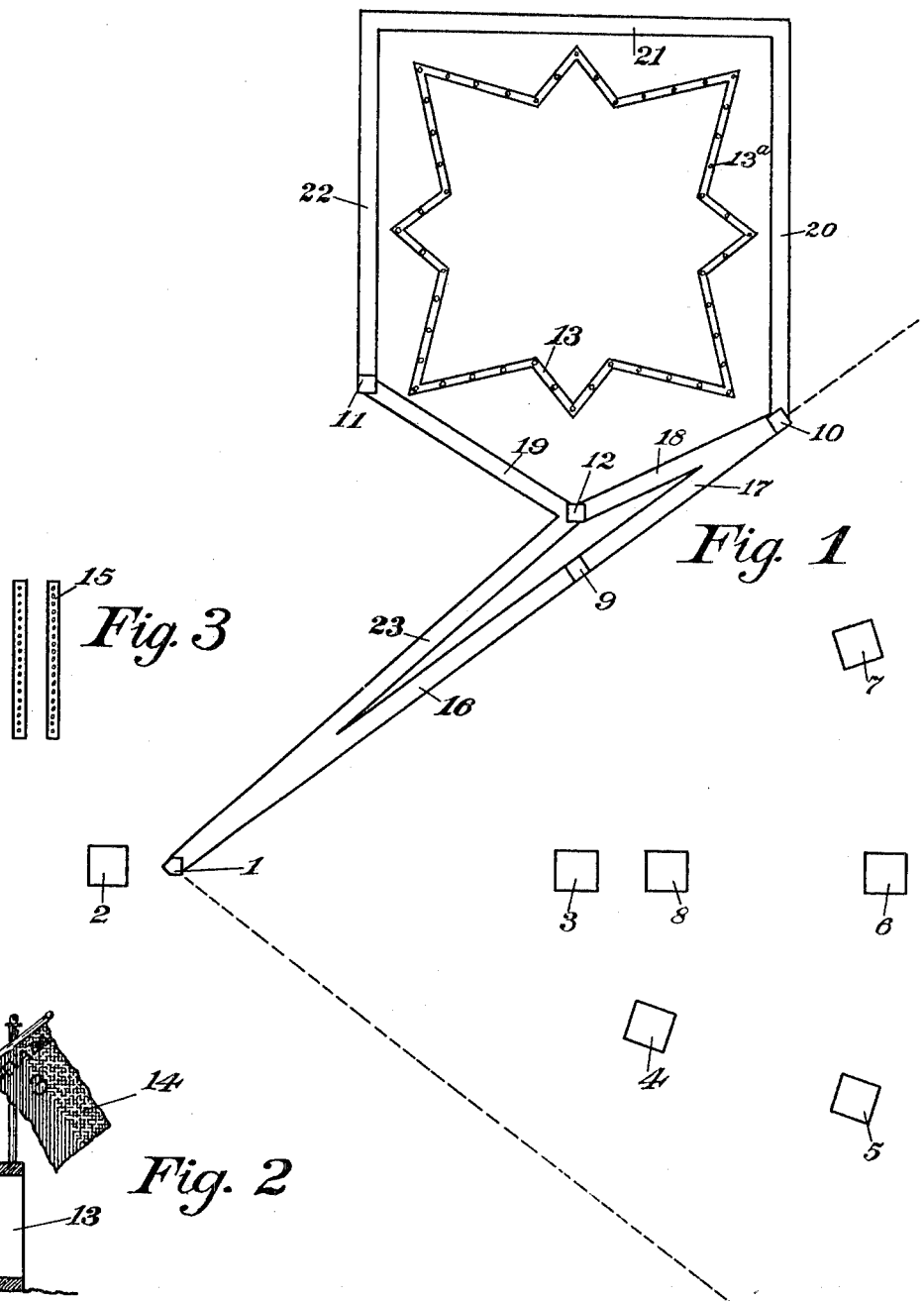

JAMES H. NOONAN, OF SAN DIEGO, CALIFORNIA.

BALL GAME.

1,120,076.  Specification of Letters Patent.  Patented Dec. 8, 1914.

Application filed June 24, 1913. Serial No. 775,531.

*To all whom it may concern:*

Be it known that I, JAMES H. NOONAN, a citizen of the United States, and a resident of San Diego, in the county of San Diego and State of California, have invented certain new and useful Improvements in Ball Games, of which the following is a specification.

My invention relates to field games and more particularly to a ball game, a portion of which is similar to the ordinary base ball game. The objects of my invention are, first, to provide a ball game that has all the advantages of the ordinary base ball game and additional educational features, second, to provide such a game that tends toward patriotism, and third, to provide a means for keeping score so that the spectators may have an opportunity of knowing what the score is.

With these and other objects in view, as will appear hereinafter, my invention consists of certain novel features of construction, combination and arrangement of parts as will be hereinafter described in detail and particularly set forth in the appended claims, reference being had to the accompanying drawings and to the characters of reference thereon which form a part of this specification, in which:

Figure 1 is a plan and diagrammatic view of my game apparatus complete, Fig. 2 is a detailed view of one of the banners and its mounting, and Fig. 3 is a plan view of the score holders.

Similar characters of reference refer to similar parts throughout the several views.

The home base 1, catcher's base 2, pitcher's base 3, short fielder 4, right fielder 5, center fielder 6, left fielder 7, umpire 8, base 9, base 10, base 11, base 12, banner holder 13, banner 14, score holder 15, and runways 16, 17, 18, 19, 20, 21, 22 and 23, constitute the principal parts of my apparatus.

The home base 1, catcher 2, pitcher 3, umpire 8, short fielder 4, and fielders 5, 6 and 7, occupy practically the same positions as in the ordinary base ball game. The bases, however, are to one side of the players, preferably the left side, as shown. The first base 9, occupies a position approximately the same as the third base in the ordinary base ball game, and the next base 10, is farther on in a straight line. From this base 10 there is a runway along three sides of a rectangle and another base 11, and finally base 12 a very short distance from the base 9, directly in line with the pitcher. Inside of this rectangularly shaped runway is the banner holder 13 which is star shaped as shown in Fig. 1 and it is provided with a plurality of uprights 13ª sufficient for all of the States in the Union. Upon the upper end of each of these uprights a banner 14 is mounted. These banners 14 are provided with the names of the States of the Union, one on each, and also the number of electoral votes of said State mounted thereon. They are made in colors, preferably the body in one or two colors and the name and numerals in a different color so that they are readily distinguishable from each other; for instance, New York, body, crimson, name and numerals, black, Ohio, body black, name and numerals, yellow, Kansas, body red and white, name and numerals, black, etc.

The banners having the larger number of electoral votes are placed on the banner holder in the most difficult positions to reach by the runners. Near the home base are provided two banner holders 15, one for each side and the banners are placed in position in these holders when the runner reaches home safely with his banner or banners as the case may be. There are nine players on each side as in the ordinary game and they occupy the positions as described. Instead of three base-men there is one base-man who takes care of bases 9 and 12 and the players at 10 and 11 are called "banner protectors." The batter upon striking the ball runs to first base 9, after which he is in position to procure banners to take back to the home base. He is safe on the bases 10 and 11 but must run from 9 to 10, then to either 11 or 12 and then home. He may run to any position he wants, always keeping inside of the runways 20, 21 and 22. If he goes out of these runways he is out, as well as when a ball is placed on him anywhere inside of these runways not on 9 or at 10 and 11. The runner may procure one or two banners, but if two are procured they must have similar color. The runner who reaches the home base with the banners, provided he gets there before three players are out, receives as his score the sum of the numbers on his banners, which are the number of electoral votes of the State or States of the Union he has selected. If he is put out on the run after procuring banners, or three are put out before he reaches the home base, the banners procured must be put back in their proper positions on the banner holder 13.

Though I have shown and described a particular construction or apparatus for playing this game, I do not wish to be limited to this particular construction nor to the particular rules of playing, but desire to include in the purview of my invention the construction substantially as set forth in the appended claims.

It is obvious that with this apparatus there is provided a field game which is very interesting, educational and patriotic in its nature, that the apparatus is inexpensive, easily installed, simple and durable.

Having thus described my invention, what I claim as new and desire to secure by Letters Patent, is:

1. In a ball game apparatus, the combination of a plurality of safety bases arranged substantially as set forth, a plurality of banners each provided with the name of a State and a numeral, and a banner holder adapted for a plurality of said banners, arranged adjacent to said safety bases.

2. In a ball game apparatus, the combination of a plurality of safety bases for the banners, a plurality of runways between and connecting said bases, a plurality of banners each provided with a name of a State and a numeral, and a banner holder adapted for a plurality of said banners arranged inside of a portion of said runways adjacent to said safety bases and banner holders for score keeping arranged near the home base.

3. In a ball game apparatus in combination with the bases and runways arranged as set forth, of a plurality of banners each containing the name of a State and the number of electoral votes said State has, and a star-shaped banner holder arranged relatively to said bases and runways substantially as set forth.

4. In a ball game apparatus the combination of a plurality of safety bases for the batters arranged substantially as set forth, a star-shaped banner holder adapted for a plurality of banners arranged near a portion of said safety bases, runways connecting a portion of said bases and surrounding said banner holder and two banner holders for score keeping arranged near the home base.

5. In a ball game apparatus, the combination of a plurality of safety bases for the batter, spaced apart from each other in arrangement substantially as set forth, a star-shaped banner holder adapted for a plurality of banners arranged substantially as set forth adjacent to a portion of said safety bases, a plurality of runways connecting same to said safety bases and surrounding said banner holder, two banner holders for score keeping arranged near the home base, and a plurality of banners each provided with the name of a State and with the number of electoral votes of said State, and each made in colors distinguishing one from another.

In testimony whereof, I have hereunto subscribed my name in the presence of two subscribing witnesses.

JAMES H. NOONAN.

Witnesses:
 ABRAM B. BOWMAN,
 CHESLEY G. GOATLEY.

Copies of this patent may be obtained for five cents each, by addressing the "Commissioner of Patents, Washington, D. C."